United States Patent [19]

Bobick et al.

[11] 4,453,841

[45] Jun. 12, 1984

[54] DUPLEX PRINTING SYSTEM AND METHOD THEREFOR

[75] Inventors: Thomas W. Bobick, Richardson; Frederic L. Clark; Henry W. Jongerling, both of Plano; Barry C. Kockler, Lewisville; Svetislav Mitrovich, Dallas, all of Tex.

[73] Assignee: The Mead Corporation, Dayton, Ohio

[21] Appl. No.: 355,423

[22] Filed: Mar. 8, 1982

[51] Int. Cl.³ .............................................. B41J 3/02
[52] U.S. Cl. ...................................... 400/126; 271/65;
271/186; 271/DIG.9; 355/24; 355/14 SH;
355/3 SH; 400/605; 400/76
[58] Field of Search ................ 400/126, 605, 607.2,
400/624–625, 76; 271/3.1, 186, 65, DIG. 9;
355/3 SH, 23, 24, 14 SH, 14 R; 101/382 MV

[56] References Cited

U.S. PATENT DOCUMENTS

| | | | |
|---|---|---|---|
| 4,234,180 | 11/1980 | Looney | 271/65 |
| 4,272,181 | 6/1981 | Treseder | 271/186 X |
| 4,334,765 | 6/1982 | Clark | 355/14 SH |
| 4,348,101 | 9/1982 | Schonfeld et al. | 271/186 X |

*Primary Examiner*—E. H. Eickholt
*Attorney, Agent, or Firm*—Biebel, French & Nauman

[57] ABSTRACT

A print system for duplex printing a plurality of document page images on a plurality of copy sheets includes means for storing print control information which defines the document images. An ink jet printer prints the page images on copy sheets as they are transported past a print station by a transport arrangement defining a closed sheet path. The sheet path is of sufficient length such that a number of copy sheets are transported simultaneously therethrough. A copy sheet inverter receives copy sheets sequentially from the sheet path after the sheets are printed on their first sides and returns them to the sheet path in an inverted orientation prior to printing on the second sides of the copy sheets.

9 Claims, 19 Drawing Figures

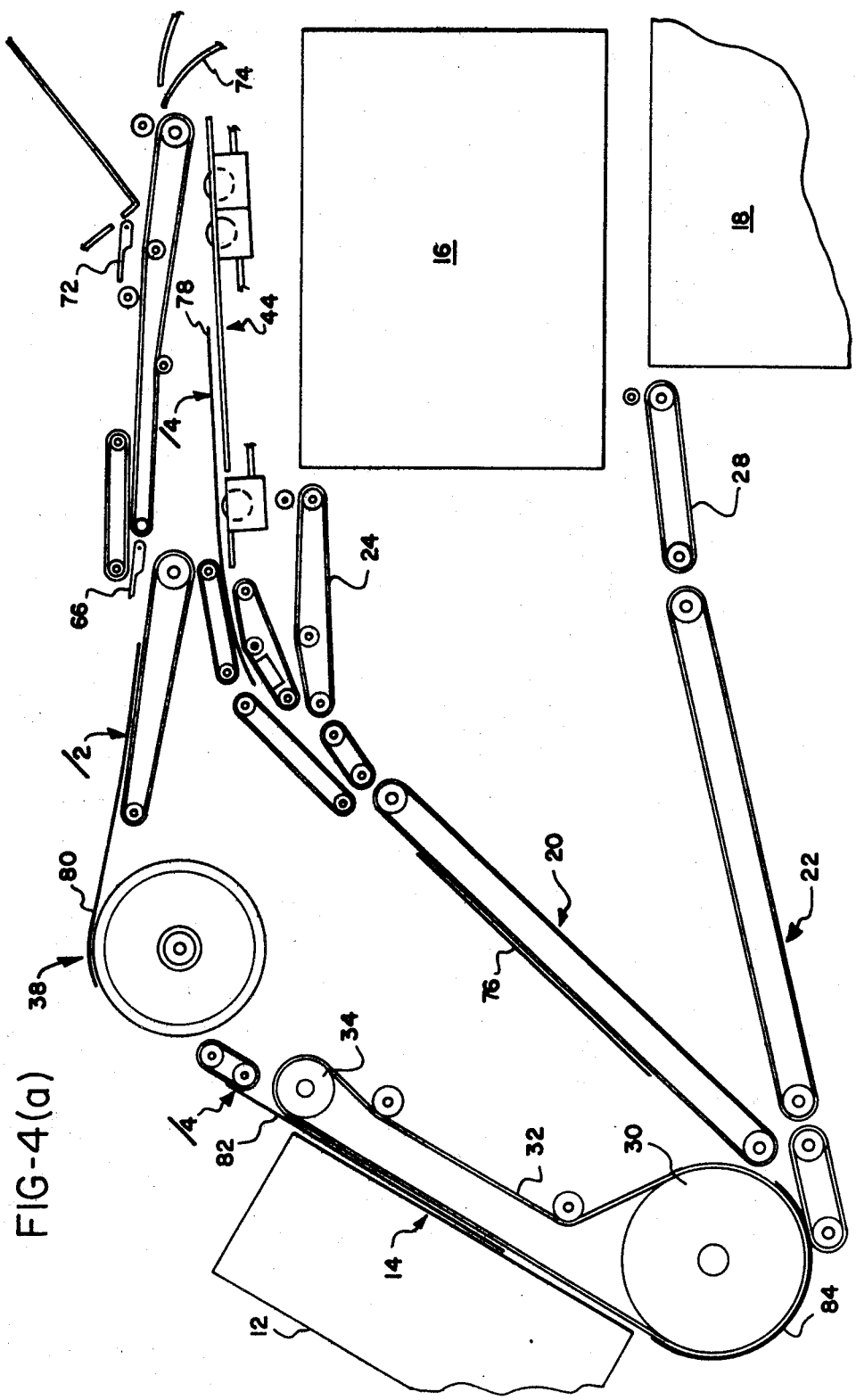

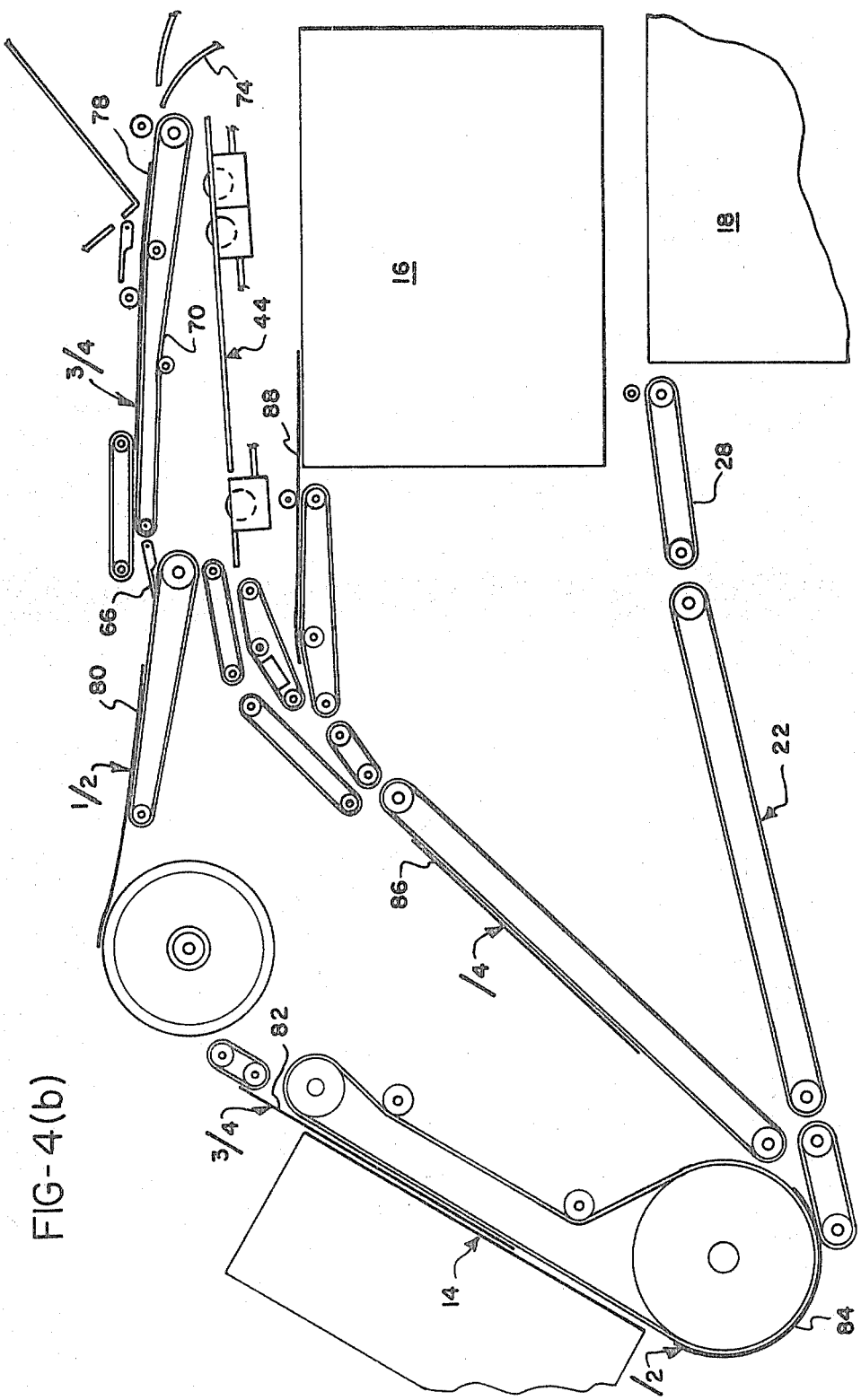

FIG-6

DUPLEX PRINTING

| # OF PAGES IN DOCUMENT | |
|---|---|
| 1 | 1-1-1-1-1 |
| 2 | ⌊2-2-2-2-2-1-1-1-1-1-1⌋-2-2-2-2-2 |
| 3 | ⌊3-2-X-2-X-2-1-3-1-3-1⌋-3-2-X-2-X-2-1-3-1-3-1-3 |
| 4 | ⌊4-2-4-2-4-3-1-3-1-3-2-4-2-4-2-1-3-1-3-1⌋-4-2-4 |
| 5 | ⌊5-4-2-X-4-2-3-1-5-3-1⌋-5-4-2-X |
| 6 | 6-4-2-6-4-5-3-1-5-3-2-6-4-2-6-1-5-3-1-5-4-2 |
| 7 | ⌊7-6-4-2-X-6-5-3-1-7-5-4-2-X-6-4-3-1-7-5-3-2-X-6- |
| | 4-2-1-7-5-3-1⌋-7-6 |
| 7 REPEAT ALT. | ⌊7-6-4-2-X-X-5-3-1⌋-7-6-4-2-X-X |
| 9 | ⌊9-8-6-4-2-X-7-5-3-1⌋-9-8 |
| 10 | ⌊10-8-6-4-2-9-7-5-3-1⌋-10-8 |
| 11 | ⌊11-10-8-6-4-2-9-7-5-3-1⌋-11-10-8 |
| 13 | ⌊13-12-10-8-6-4-11-9-7-5-3-2-X-12-10-8-1-13-11-9- |
| | 7-6-4-2-X-12-5-3-1-13-11-10-8-6-4-2-9-7-5-3-1⌋-13 |
| 15 | ⌊15-14-12-10-8-6-13-11-9-7-5-4-2-X-X-X-3-1⌋-15-14 |
| 16 | ⌊16-14-12-10-8-15-13-11-9-7-6-4-2-X-X-5-3-1⌋-16 |
| 22 | ⌊22-20-18-16-14-21-19-17-15-13-12-10-8-6-4-11-9-7-5- |
| | 3-2-X-X-X-X-1⌋-22-20 |

X = BLANK
⌊___⌋ = REPEATS

FIG-8

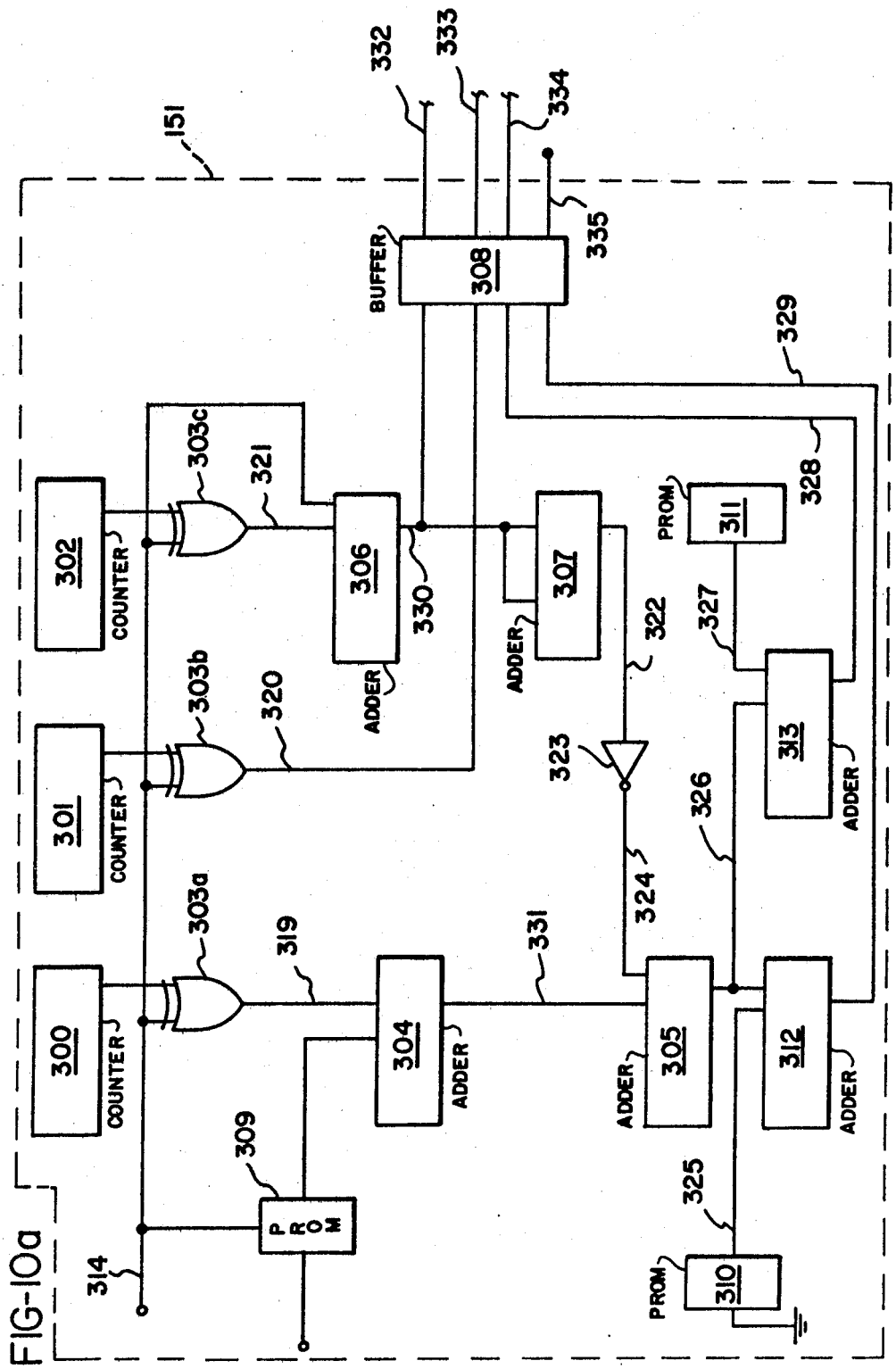

DUPLEX PRINTING SYSTEM AND METHOD THEREFOR

BACKGROUND OF THE INVENTION

The present invention relates to a printing system and, more particularly, to a printing system in which multiple-page documents may be duplex printed.

A number of different prior art printing systems have had a duplex printing capability. For example, Wick U.S. Pat. No. 4,066,252 and Satomi et al U.S. Pat. No. 4,218,130 disclose xerographic copiers including an arrangement for transporting a copy sheet past a print station, inverting the sheet, and then transporting it past the print station a second time. In the Wick '252 system, after a sheet is printed on a first side by contact with a photosensitive belt and fixation of the transferred image, it is transported to an output accumulation tray. The sheet is then withdrawn from the output accumulation tray and re-introduced into the paper path, while at the same time being turned side for side. The sheet is reapplied to the photo-sensitive belt with its second side in contact with the belt, and printing on this side is accomplished.

It is significant that only one sheet is present at any time in the copy sheet paper path. After printing on the first side of a sheet it is transported to the output accumulation tray, effectively inverted, returned to the print station, and then transported again to the output accumulation tray. Only at this point is the next successive sheet of copy paper supplied to the paper path. As a consequence, the duplex printing speed of the Wick '252 system is limited by the fact that a substantial amount of time is required between successive printing operations while a sheet is inverted, or removed from the paper path and a new sheet supplied to the paper path. The actual printing operation occupies a relatively small portion of the time required for producing each duplex printed sheet.

The Satomi et al '130 patent discloses a xerographic copier similar to that of Wick '252. In the Satomi et al device, however, after one side of a sheet is printed, the sheet is supplied to a sheet inverting tray which is separate from the output accumulation tray output. Supplying the sheet to this tray and then removing it from the tray results in the sheet being inverted as it is reintroduced into the paper path. As in the device disclosed in the Wick '252 patent, the first embodiment of Satomi et al '130 permits only one copy sheet to circulate through the paper path at any time and, therefore, this embodiment is limited in its operating speed. In an alternative embodiment, the Satomi et al '130 patent discloses a duplex printer which has two intermediate duplex trays. Sheets of copy paper are stacked in these trays after printing the first sides thereof and prior to returning the sheets to the print station for printing on the second sides of the sheets. This arrangement is utilized when it is desired to print duplex copies with the copies having front and back images not corresponding to the front and back images on the pages of the original document. Such intermediate storage is required since the xerographic copying device disclosed does not provide an arrangment for image storage prior to printing. It will be appreciated, however, that stacking the partially printed sheets may be undesirable, especially where there is a possibility of inadvertent print image transfer between the stacked sheets, or smearing of the print images during stacking and refeeding.

DiFrancesco et al U.S. Pat. No. 4,174,905 discloses a printer arrangement for making duplex copies. Each sheet of copy paper is supplied in sequence to a first printing station, to an inverter station, and finally to a second printing station. Opposite sides of each sheet are printed at the first and second printing stations. This device requires several print stations to accomplish duplex printing. While it is capable of higher speed operation than the above discussed Wick and Satomi et al devices, nevertheless it requires a substantial amount of space.

Accordingly, it is seen that there is a need for an improved printing system in which high speed duplex printing of a plurality of copy sheets may be accomplished at a single print station.

SUMMARY OF THE INVENTION

A printing system for duplex printing a plurality of document images on a plurality of copy sheets includes memory means for storing print control information defining the plurality of document images. A printer means selectively prints the document images on copy sheets as the sheets are transported past a print station. A copy sheet transport means, which transports the copy sheets past the print station, defines a closed sheet path of sufficient length that a predetermined number of copy sheets may travel through the path simultaneously. A copy sheet supply means supplies sheets to the transport means and an inverter means receives copy sheets sequentially from the transport means, after printing on a first side thereof, and immediately returns the sheets to the transport means in an inverted orientation. An output means receives sheets from the copy sheet transport means after duplex printing is completed. A control means selectively directs the copy sheets in the closed sheet path to the output means or to the inverter means subsequent to printing, whereby a plurality of sheets transported by the transport means past the printer are printed on a first side, inverted, and subsequently printed on a second side prior to being directed to the output means.

The control means comprises means for controlling operation of the copy sheet supply means such that printed sheets directed to the output means are replaced in the sheet path by copy sheets from the copy sheet supply means, whereby the predetermined number of sheets are maintained in the closed sheet path. The copy sheet inverter means may include means for returning each inverted copy sheet to the copy sheet transport means prior to inversion of the next copy sheet received by the copy sheet inverter means.

The printing system may further comprise means for retrieving the print control information from the memory means in a first order for printing on the first sides of the sheets, and for retrieving the print control information from the memory means in a second order for printing on the second sides of the sheets, such that the document images on the first and second sides of the sheets have their upper portions adjacent the same edges of the sheets.

The method by which the printing system operates may include the steps of:

(a) sequentially supplying a predetermined plurality of copy sheets from the sheet supply to the sheet path;

(b) sequentially transporting the sheets along the sheet path past the print station for printing selected ones of the document images on the first sides of the sheets;

(c) sequentially printing selected ones of the document images on the first sides of the sheets;

(d) sequentially removing from the sheet path each of the sheets which is to be duplex printed and inverting each of the sheets;

(e) sequentially returning each of the inverted sheets to the sheet path and transporting each of the inverted sheets past the print station for printing selected ones of the document images on the second sides of the sheets to produce duplex printed sheets; and (f) transporting the duplex printed sheets to the output.

The step of sequentially printing selected ones of the document images on the second sides of the inverted sheets may include the step of printing images on the second sides of the inverted sheets in an orientation which is inverted with respect to the orientation in which document images are printed on the first sides of the sheets.

The method may further include the steps of:

(a) retrieving the print control information from the memory in a first order to control printing on the first sides of the sheets; and (b) retrieving the print control information from the memory in a second order to control printing on the second sides of the sheets to control printing in an orientation which is different with respect to the print station than the orientation in which the first sides of the sheets are printed.

The method may further include the step of periodically sequentially supplying an additional predetermined plurality of copy sheets from the sheet supply to the sheet path for printing on the first sides thereof after printing on the second sides of at least some of the previously supplied predetermined plurality of copy sheets.

The step of periodically sequentially supplying an additional predetermined plurality of copy sheets from the sheet supply to the sheet path may include the step of supplying the additional predetermined plurality of copy sheets to the sheet path such that the additional predetermined plurality of copy sheets follow the previously supplied predetermined plurality of copy sheets in the sheet path. The second sides of the previously supplied predetermined plurality of copy sheets may be printed prior to printing the first sides of the additional predetermined plurality of copy sheets.

The step of sequentially returning each of the inverted sheets to the sheet path may include the step of returning each inverted sheet to the sheet path prior to completing the inversion of the following sheet.

Accordingly, it is an object of the present invention to provide such a printing system and method of printing in which a plurality of copy sheets are simultaneously transported through a closed copy sheet path, which path extends past a printing station, and in which each sheet travels past the printing station twice prior to removal from the closed copy sheet path, whereby each sheet is duplex printed; to provide such a printing system and printing method in which a sheet inverter is provided adjacent the sheet path for receiving therefrom copy sheets and returning the copy sheets substantially immediately to the path in an inverted orientation; and to provide such a printing system in which the copy sheets, having been duplex printed, are delivered to an output in a desired order.

Other objects and advantages of the invention will be apparent from the following description, the accompanying drawings and the appended claims.

BRIEF DESCRIPTION OF THE DRAWINGS

FIGS. 4(a) and 4(b) illustrate the print sequence for duplex printing a four-page document on two copy sheets;

FIG. 6 is a chart illustrating the print sequence for duplex printing multiple page documents having various numbers of pages;

FIG. 8 is a diagrammatic illustration of printing positions as sequentially printed by drops from three adjacent drop streams;

FIGS. 10a and 10b are a block diagram of a control means for data reorganization;

DETAILED DESCRIPTION OF THE PREFERRED EMBODIMENT

Figure 1:
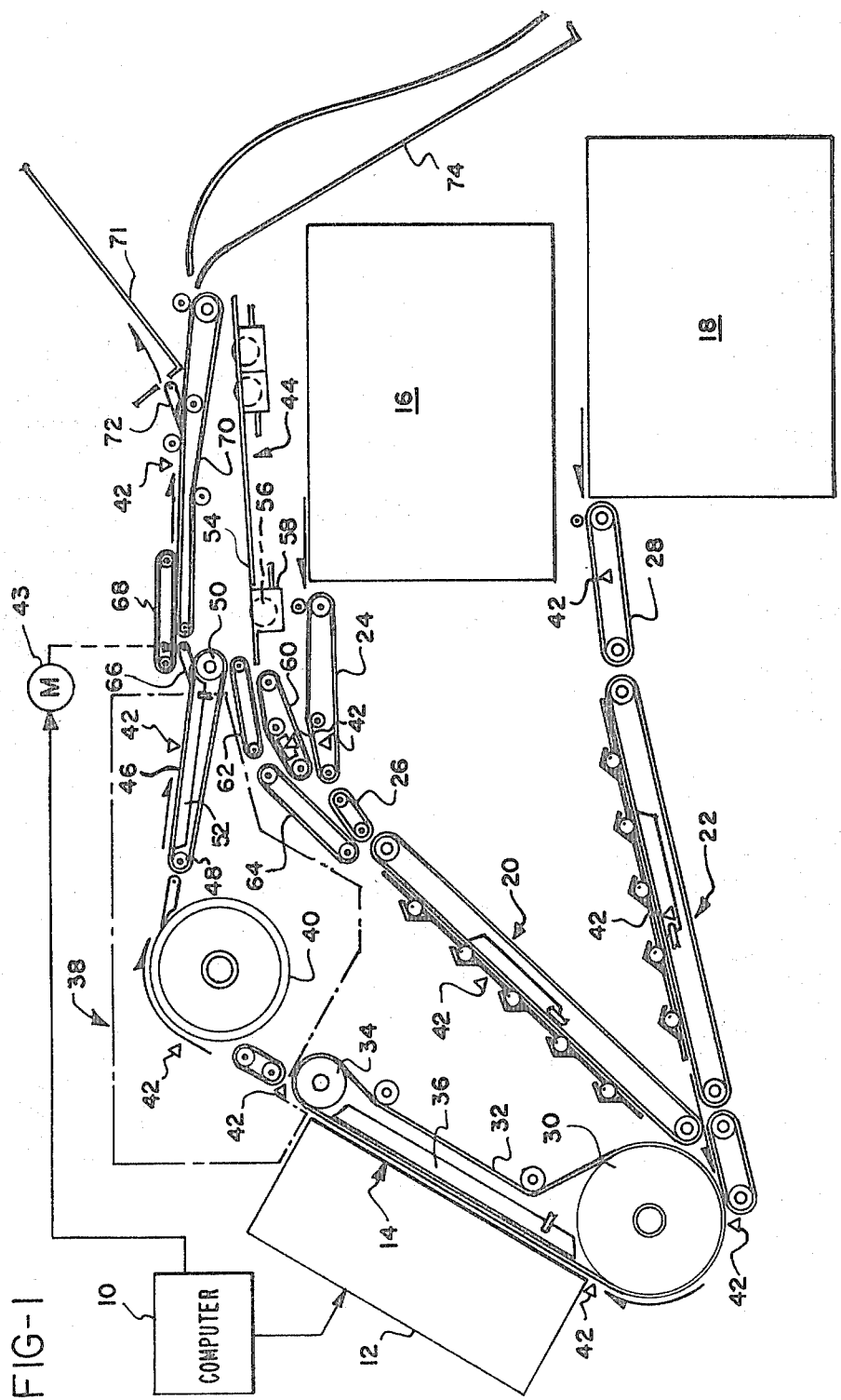
FIG. 1 is a side view of the printing system of the present invention, illustrating the paper path through the printing system during simplex printing and delivery of the simplex printed sheets to a sample copy tray.
Figure 2:
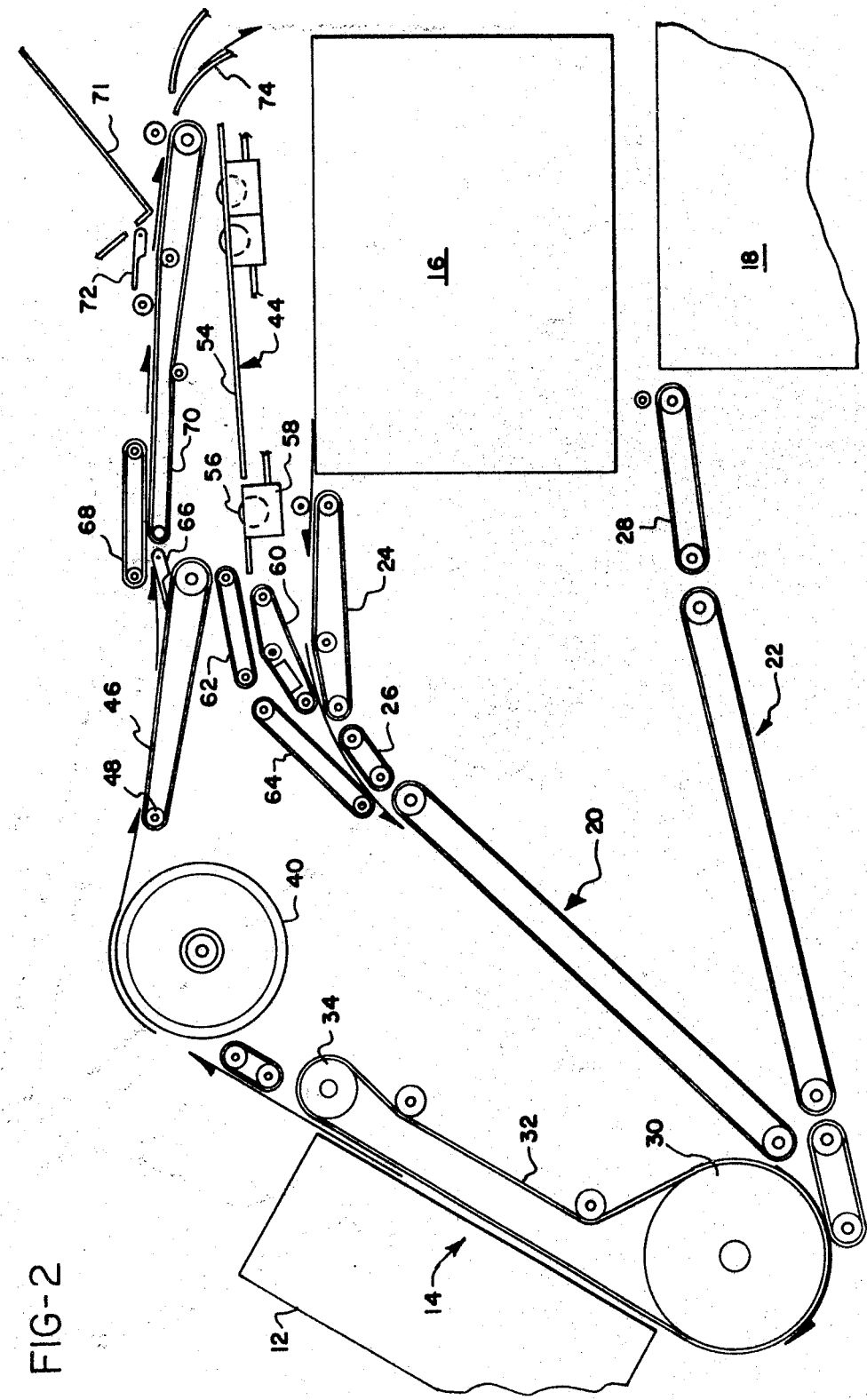
FIG. 2 is a view, similar to FIG. 1 but slightly enlarged and simplified, illustrating the paper path through the printing system during simplex printing and delivery of simplex printed copy sheets to a sheet output accumulator tray.
Figure 3:
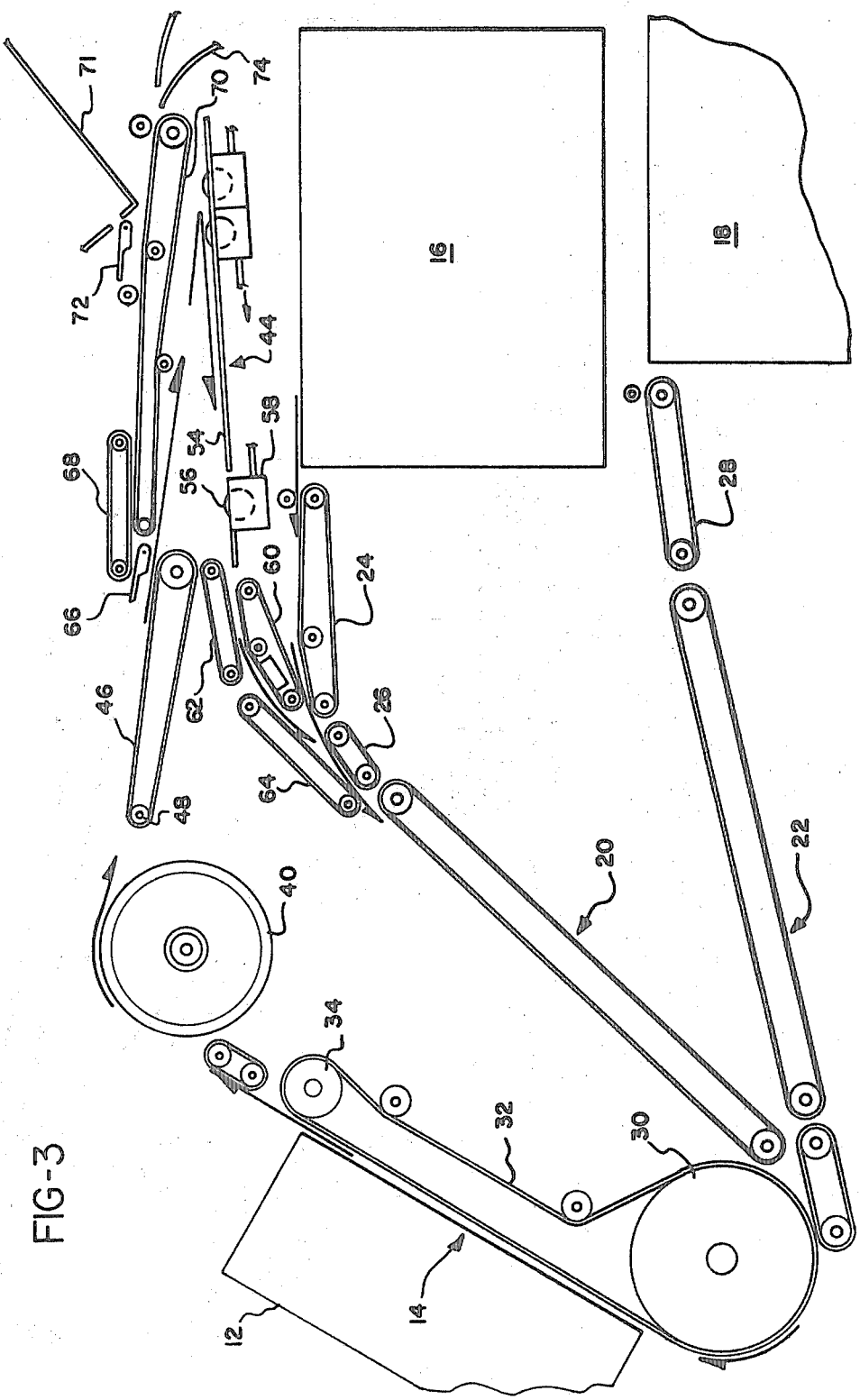
FIG. 3 is a view, similar to FIG. 2, illustrating the paper path through the printing system during duplex printing.

FIGS. 1, 2, and 3 are schematic representations of a printing system according to the present invention which is capable of either simplex or duplex printing. The path of a copy sheet during simplex printing is shown in FIGS. 1 and 2, and the path of a copy sheet during duplex printing is shown in FIG. 3. It should be noted that FIGS. 2 and 3 are slightly enlarged and simplified with respect to FIG. 1.

A computer 10, including an appropriate memory, such as a disc storage unit, provides a means for storing print control information which defines a plurality of document page images which are to be printed. The print control information may be derived by an optical scanner system (not shown) which has previously scanned each page of a multipage original document. Alternatively, the print control information may be compiled solely by the computer system which, for example, has assembled print control information in response to input of information specifying a sequence of alpha-numeric characters to be printed. One such system is shown in Frey U.S. Pat. No. 3,913,719.

However derived, the print control information is supplied from the memory of computer 10 to a printer means 12, such as an ink jet printer, which selectively prints the desired document images on copy sheets transported past a print station, indicated generally at 14. A copy sheet supply means includes a pair of supply stations 16 and 18 which provide blank sheets of copy paper to associated sheet feed and alignment sections 20 and 22, respectively. Sheets of paper from supply station 16 are applied to sheet feed and alignment section 20 via belts 24 and 26, while sheets from supply station 18 are transported to sheet feed and alignment section 22 by belt transport 28. Sheets are shifted laterally as they are transported through alignment sections 20 and 22 to provide lateral alignment prior to presentation of the sheets to a vacuum drum 30. Belts 32 extend around drum 30 and roller 34 and pass over vacuum plenum 36. Sheets supplied to drum 30 are carried on the belts 32 past the print station 14.

After printing on one side of a sheet, the sheet is delivered to a drying station 38 which includes drying means and a vacuum drum 40. When the second side of the sheet is to be printed, the sheet is then delivered to a sheet inverter 44 by a transport section including belts 46, as shown in FIG. 3. Belts 46 extend around rollers 48 and 50 and a vacuum plenum 52 to which a partial vacuum is applied. The inverter 44 includes an inverter tray 54 which receives the sheet, and by means of drive wheels 56 extending upward through openings in vacuum plenum 58, the sheet is returned to the alignment section 20 via belts 60, 62, and 64.

At a subsequent point in the duplex printing operation, or during simplex printing, sheets may be removed from the belts 46 by gate 66 which may be pivoted downward into the position shown in FIG. 1. Gate 66 strips the sheets from belt 46 and delivers them to an output means. The output means includes belts 68 and 70, which delivers the sheets to an output sample tray 71, when gate 72 is pivoted downward as shown in FIG. 1, or to an accumulator tray 74 when gate 72 is pivoted upward as shown in FIG. 2.

Thus, it is seen that the printer includes a number of belts and vacuum drums which act collectively as a copy sheet transport means for transporting copy sheets through a closed sheet path past the print station 14. This closed sheet path is sufficiently long with respect to the size of the copy sheets that a plurality of copy sheets may travel through the path simultaneously.

A control means, including gate 66, selectively directs copy sheets in the sheet path to the output means or to the inverter means 44 after printing by the printer 12. As described more completely below, this facilitates a duplex printing operation in which a plurality of sheets are transported by the transport means past the printer, printed on a first side, inverted, and subsequently printed on a second side prior to being directed to the output means. Motor 43, responsive to computer 10, provides a means of moving gate 66 into the selected gate position. Computer 10 receives signals from photo-optical detectors 42 positioned along the sheet path so that the timing of the printing operation, gate actuation, and other printer functions may be properly timed in accordance with the movement of sheets through the sheet path.

The gate positions illustrated in FIG. 1, if maintained continuously during the operation of the printer system would result in simplex printing and delivery of the printed sheets to the sample copy tray 70. The unprinted sheets of paper are fed from either of the sheet supplies 16 and 18, aligned by registration sections 20 and 22, and, as they are carried past the printer 12 by belt 32, are printed on the side thereof facing the printer 12. The sheets are then dried in dryer section 38, and delivered to the sample tray 70. A similar sheet path is illustrated in FIG. 2 in which copy sheets are simplex printed and, thereafter, delivered to the accumulator tray 74.

Finally, by initially pivoting gate 66 upward, as shown in FIG. 3, a sheet of copy paper may be duplex printed. The sheet is supplied from supply 16 or from supply 18 and printed on a first side thereof by printer 12 as the sheet moves past the print station 14. After drying, the sheet is delivered to the inverter 44 and, subsequently, returned to the closed paper path in an inverted orientation. The sheet is then aligned by alignment section 20 and carried past the print station 14 by belts 32 with its second side facing the printer 12. The sheet has now been printed on both sides. Subsequent to drying, the sheet is stripped from belts 46 by gate 66 and delivered to either the sample tray 70 or the accumulator tray 74, as may be selected by the system operator.

As seen in FIGS. 4(a) and 4(b), the closed sheet path is of sufficient length that a plurality of copy sheets, as controlled by computer 10, may be transported by the transport means through the path simultaneously. In the printer system illustrated, five copy sheets are simultaneously transported through the closed sheet path. It will be appreciated, however, that when copy sheets of greater length are printed, it may be necessary to reduce the number of sheets simultaneously circulating through the sheet path.

FIGS. 4(a) and 4(b) serve to illustrate the sequence by which a two-sheet, four-page document is printed in a duplex fashion. FIG. 4(a) depicts the position of the first five sheets just subsequent to the fifth sheet 76 being supplied to the alignment section 20 from sheet supply 16. Associated with each of the sheets is a notation indicating the page number of the image or images printed on the sheet. Thus, " /4" indicates that the image for the fourth page has been printed on one side of the sheet, while no image has, as yet, been printed on the opposite side of the sheet. Similarly, "$\frac{1}{2}$" indicates that both sides of a sheet have been printed with the image for page 1 being printed on one side of the sheet and the image for page 2 being printed on the opposite side of the sheet. The first sheet supplied to the sheet path, sheet 78, has been printed on its first side with the image for page 4 of the document and is being removed from the inverter 44. Similarly, the sheet 80 has had the page 2 image printed on one side, while the opposite side remains blank. Sheet 82 has had the image for page 4 printed on one side. Sheet 84 is at this point blank on both sides.

FIG. 4(b) shows the printing system at a later point. It should be noted that gate 66 has now been pivoted downward such that the sheet 78, which has been duplex printed with the images for pages 3 and 4, has been diverted onto belt 70 for transport to the accumulator tray 74. It should be further noted that sheet 88 is being supplied to the closed sheet path from supply 16 to replace sheet 78 which has been removed from the sheet path.

Sheet 78 will be received into tray 74 with its page 3 side facing upward and, subsequently, sheet 80 will be delivered to tray 74 such that it is stacked on top of sheet 78 with its page 1 side facing upward. Sheets 78 and 80 therefore form a duplex printed two-sheet, four-page document which, as received by the accumulator tray 74 requires no collation. Similarly, sheets 82 and 84, when delivered to accumulator output tray 74, will form a second set of the two-sheet, four-page document, also properly collated. In like manner, sheets 86 and 88, when printed on both sides, will form a third set of the two-sheet document. Sheet 86 on transport past the print station 14, will have the page 3 image printed on its second side. This sheet will then be delivered to the output accumulator tray 74. Sheet 88, on the other hand, has not, as yet, been printed on either of its sides. As a consequence, this sheet will make two printing passes, with an intermediate inversion in inverter 44 prior to being delivered to output accumulator tray 74 and being stacked on top of sheet 86.

The sequence in which the page images are printed will vary in dependence upon the number of pages in the document. FIG. 6 illustrates a number of such sequences. Each printing sequence is based upon the assumption that five copy sheets are maintained in the closed sheet path on a continuing basis, i.e., as duplex printed sheets are delivered to the output, they are replaced with unprinted sheets from the sheet supplies. It will be understood, however, that the printing sequence may not be precisely as illustrated in FIG. 6 where a very small number of copies of a multipage duplex printed document are to be produced. For instance, if a two-page, one-sheet document were to be printed, with only two copies of the document being desired, the printing sequence would be 2-2-1-1, rather than that shown in FIG. 6, since it would be unnecessary to supply more than two copy sheets to the closed sheet path. Additionally, if a lesser or greater number of copy sheets are simultaneously circulated through the closed sheet path, the print sequences will necessarily be altered. The underlining for each of the sequences indicates repeating of the page number sequences. The letter "X" has been used to indicate that no page image is printed on a sheet as the sheet passes through the print station.

Figure 5A:
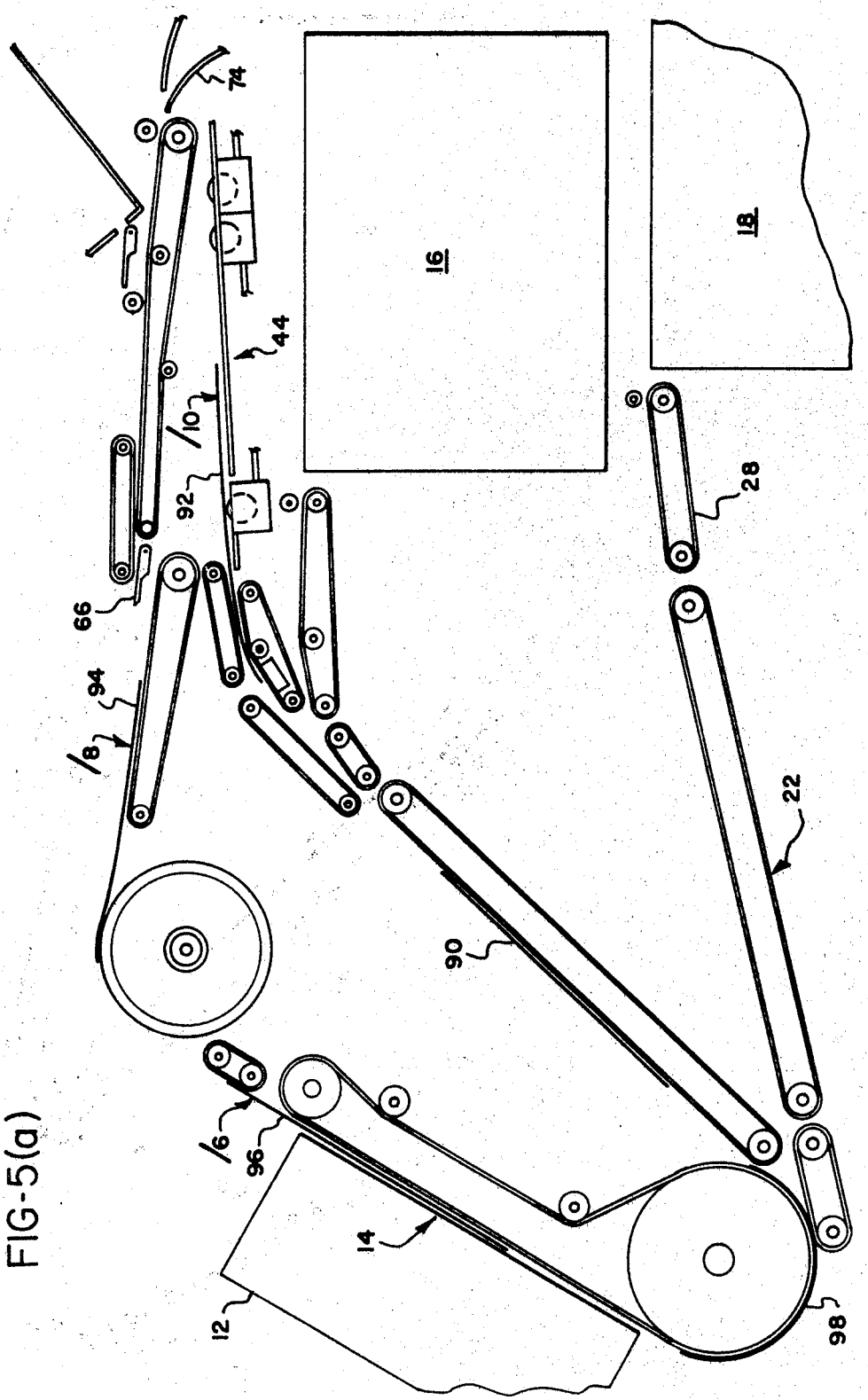
FIGS. 5(a) and 5(b) illustrate the print sequence for duplex printing a ten-page document on five copy sheets.
Figure 5B:
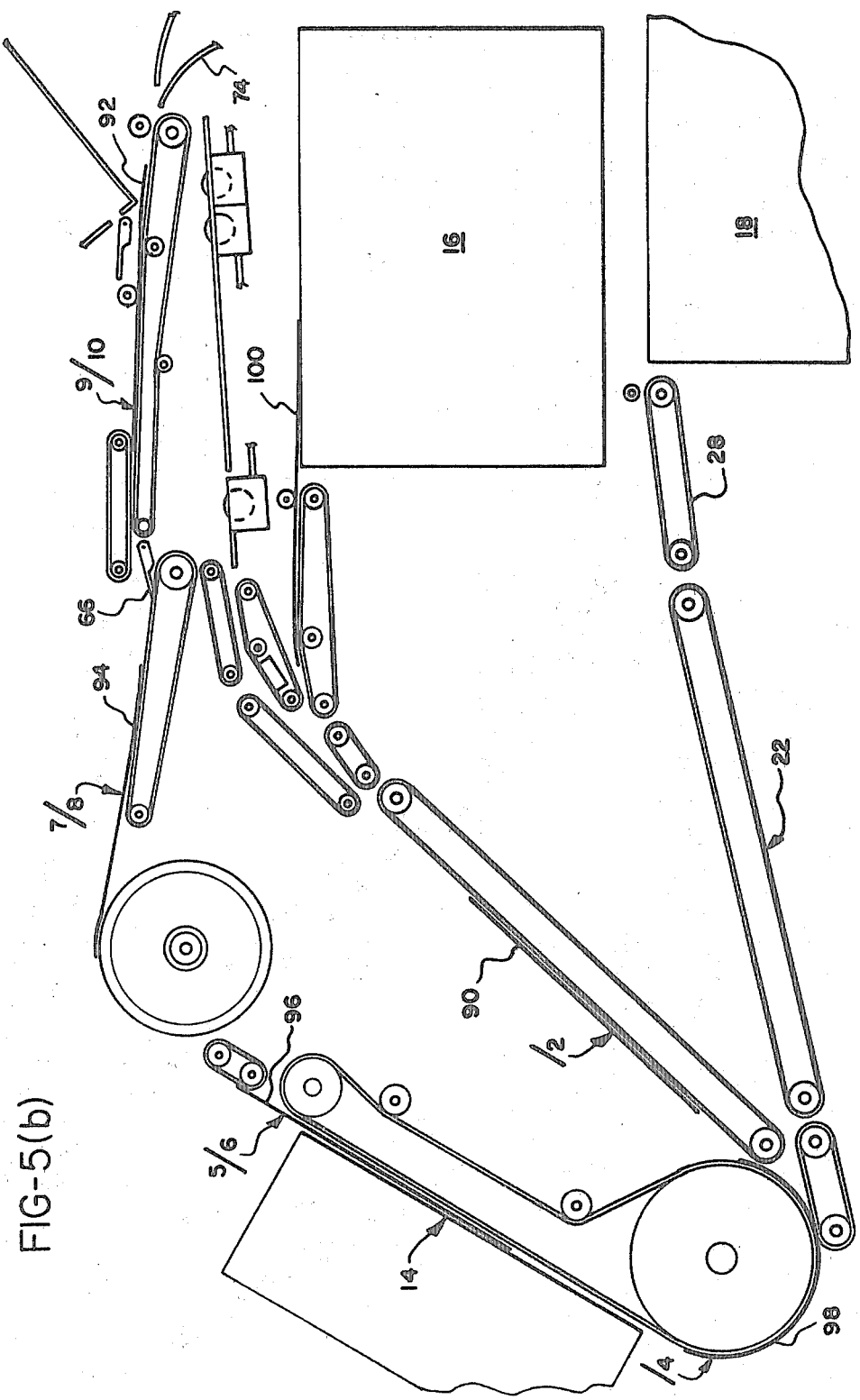

FIGS. 5(a) and 5(b) serve to illustrate the sequence by which a five-sheet, ten-page document is printed. FIG. 5(a) depicts the position of the copy sheets shortly after the delivery of the fifth sheet 90 to the closed sheet path. The first sheet supplied to the sheet path, sheet 92 has been printed on one side thereof with the document image for page 10. The second sheet supplied to the closed sheet path, sheet 94, has been printed on one side thereof with the document image for page 8. The third sheet supplied to the sheet path, sheet 96 is in the process of being printed with the image for page 6. Sheet 98 has not at this point been printed on either side.

FIG. 5(b) shows the printing system at a subsequent point in time. It should be noted that gate 66 has now been pivoted downward so as to deliver the duplex printed sheets to the output accumulator tray 74. Gate 66 will be pivoted upward to the position shown in FIG. 5(a) after the last of the first five sheets initially supplied to the closed sheet path, sheet 90, has been removed therefrom. Sheet 100 is in the process of being supplied to the closed sheet path from supply 16 and during its first printing pass will be printed with the document image for page 10.

It will be appreciated that the printing system and method of the present invention provide substantial advantages over prior art systems and methods. The copy sheets are not stacked in an intermediate inverter tray after a first printing operation and prior to a second printing operation, as is common with prior art duplex printers. As a consequence, the possibility of ink being smudged or transferring to other sheets in a stack is eliminated. By providing a closed sheet path in which a plurality of copy sheets are continuously and repeatedly circulated past the print station, the present invention makes maximum use of the print capabilities of the printer. Therefore, the number of copy sheets which may be printed in a given period of time by the printer system of the present invention is substantially greater than that of prior art devices of the type in which both sides of a single copy sheet are printed prior to supplying any other copy sheets to the printer sheet transport.

In the above discussion, the orientation of the document images which are duplex printed on the sheets has not been addressed. Typically, each of the sheets is transported through the closed sheet path with one of its shorter edges being the leading edge. If a sheet is transported past the print station 14 with one of its shorter edges being the leading edge and the first side of the sheet printed, and, after inversion, transported past the print station with the other of its shorter edges being the leading edge, it will be appreciated that the image on the second side of the sheet will be inverted with respect to the image on the first side of the sheet if both images are printed top to bottom. For sheets which are to be bound at their left hand edges in a book-like format, it will be further appreciated that such image orientation is unacceptable.

In order for the images to be properly oriented, it is necessary to rotate the data used for controlling printing of the second sides of the sheets through an angle of 180°. This may be accomplished in two successive 90° rotations. Rotation through 90° is accomplished conveniently as shown in Periera U.S. Pat. No. 4,084,195, in Latspeich U.S. Pat. No. 4,271,476, or in Evans U.S. Pat. No. 4,168,488. Alternatively image inversion by transformation of print control data may be accomplished as discussed below.

Figure 7:
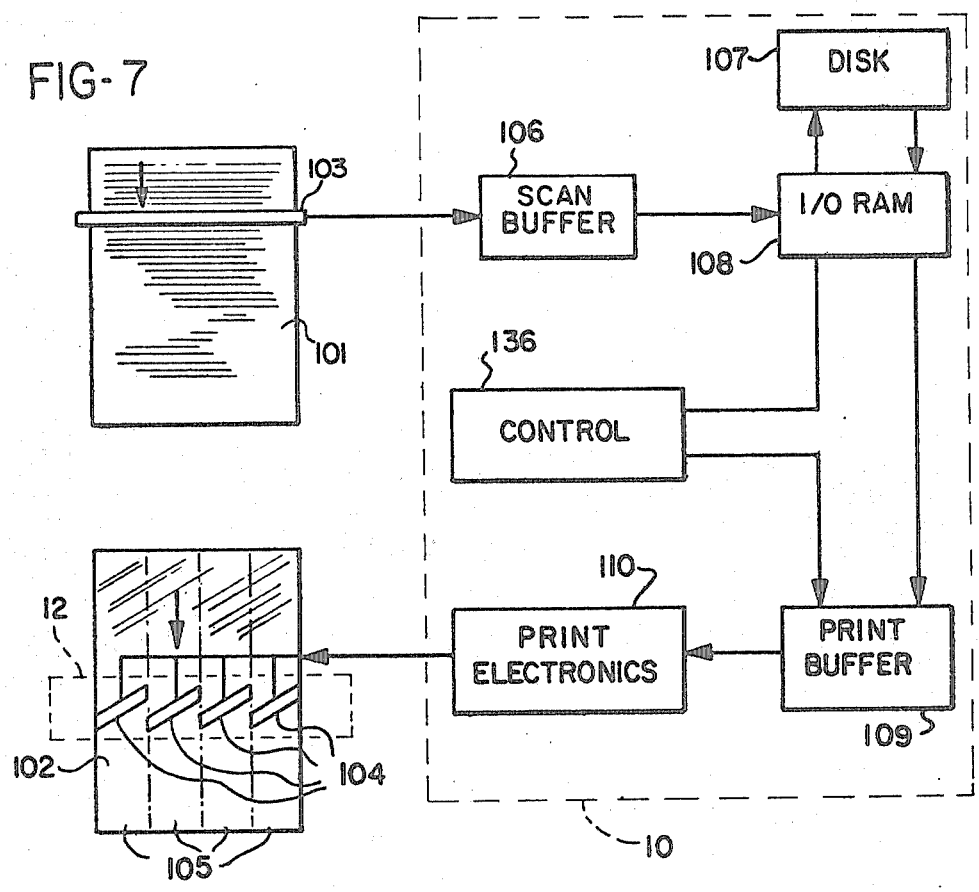
FIG. 7 is a block diagram of a duplicating system according to the present invention.
Figure 8:
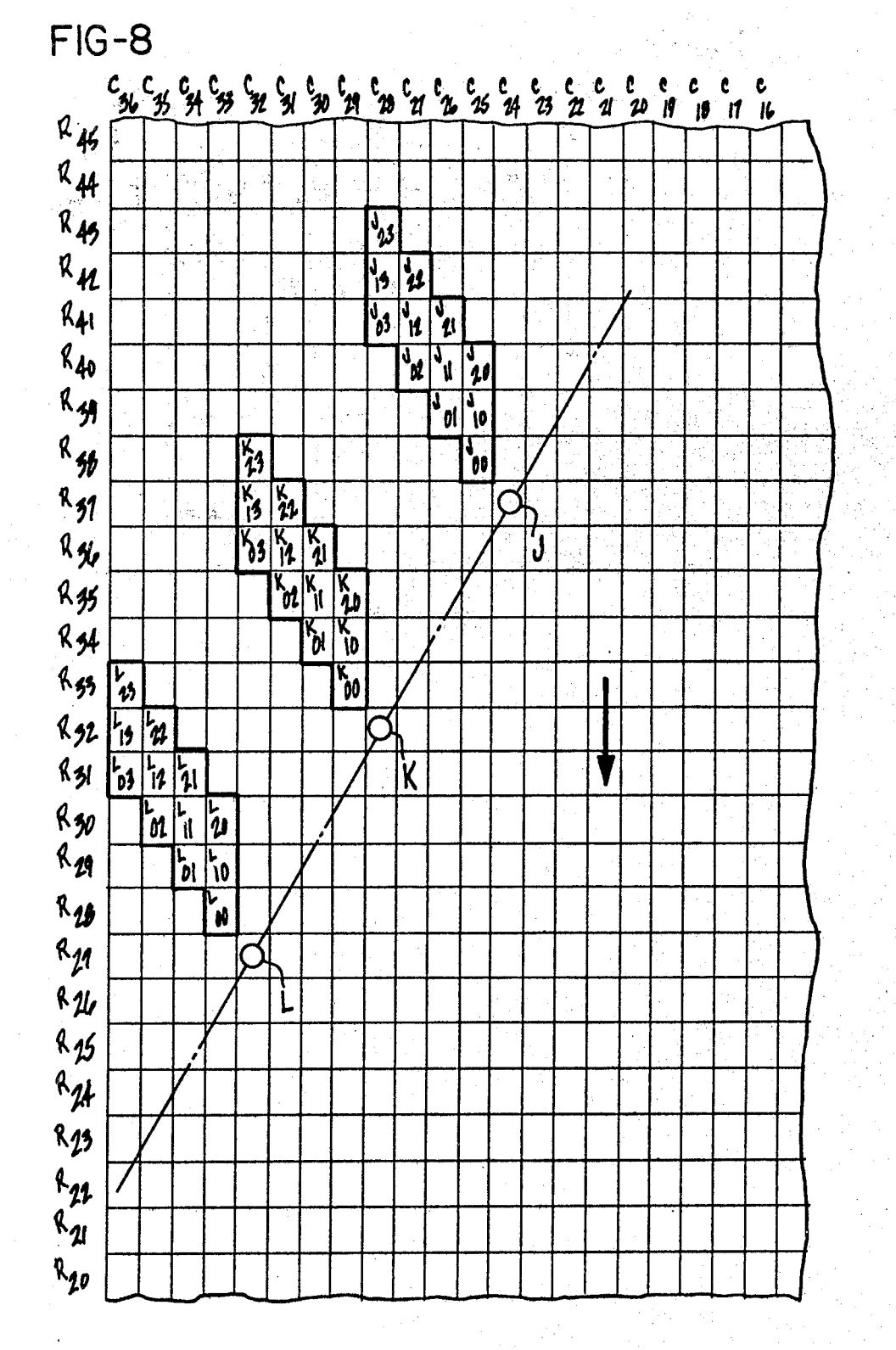

FIG. 7 illustrates a document scanner, data system, and printer according to the preferred embodiment of the invention. An original document 101 may be scanned by a laterally extending scanning array 103 for subsequent duplication on a copy sheet 102 by printer means 12 which includes a series of angularly arranged printing heads 104. Each printing head 104 prints within one of a series of contiguous bands 105 collectively covering an area at copy sheet 102 which is to be printed. Printing heads 104 operate under control of computer 10, the portion of which relating to storage and handling of print control information being depicted in FIG. 7. Computer 10 includes printing electronics 110 which generate charging control signals, as hereinafter described, in response to print control information from print buffer 109. The printing data in print buffer 109 is arranged in a format so as to produce printing as illustrated in FIG. 8.

Scanning signals from scanning array 103 are supplied to scan buffer 106 as a series of analog voltages from each of a series of photosensors comprising scanning array 103. Accordingly, scan buffer 106 includes circuitry for digitizing the analog scanning signals. The digitized output indicates a black/white representation for each of the picture elements or "pels" within a two-dimensional cartesian grid on the face of document 101. If desired, the image data may be filtered by digital filtering techniques for improvement of the image to be reproduced. Also, the image data may be processed in a conventional manner to provide a pseudo gray scale or tone image.

After the image data has been appropriately processed, it is stored in scan buffer 106 on a scan line basis. When a complete scan line has been stored, it is transferred as 16-bit parallel data to Input-Output RAM 108. After being transferred to I/O RAM 108, the data is formatted into blocks of 234 scan lines. After each complete block of data has been assembled, it is transferred to a magnetic disk 107 as 8-bit parallel data. Two transfers are required for each block of data because of the data reorganization from 16-bit bytes into 8-bit bytes. The transfer from scan buffer 106 through I/O RAM 108 and into disk 107 proceeds under control of control unit 136. It will be noted that the image data is stored on disk 107 in a sequence as generated by scan buffer 106.

After all scanning for a particular printing job (which may include a number of origial documents 101) has been completed, output printing begins. At this time the scan data stored on disk 107 is transferred back to I/O RAM 108 in a 16-bit parallel transfer. Once again the data is stored in blocks representing 234 scan lines. Once the data has been returned to I/O RAM 108 it is read out to print buffer 109, under control of control unit 136. Control unit 136 operates in accordance with an algorithm, as hereinafter described, to calculate memory locations within I/O RAM 108 for readout to print buffer 109. The print control information supplied to print buffer 109 is used for printing control as above described.

Figure 9:
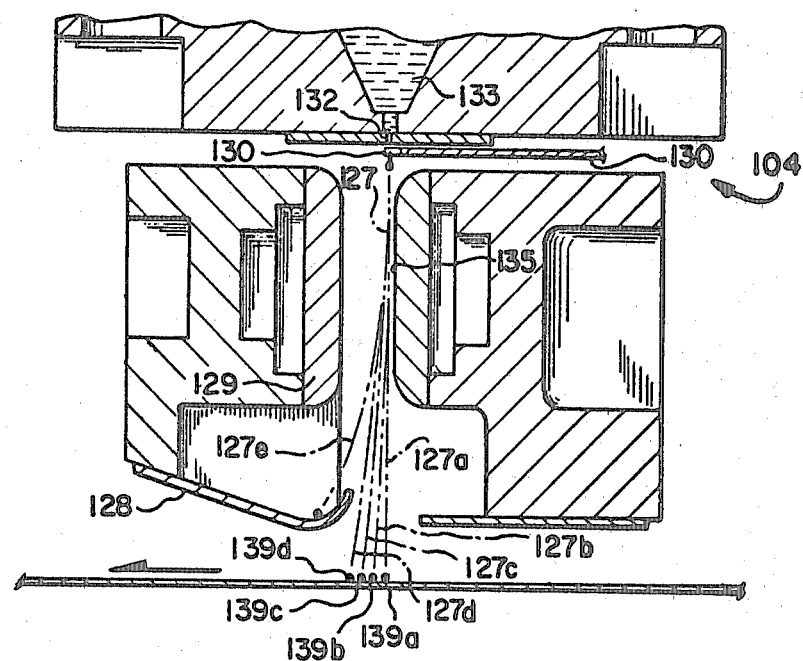
FIG. 9 is a partial cross sectional view of an ink drop printing head for use in practicing the invention.

Each of print heads 104 may be constructed as generally illustrated in FIG. 9. The overall operation of one of print heads 104 is similar to the operation of a print head of the type illustrated in Paranjpe U.S. Pat. No. 4,085,409. A supply of printing ink for carrying out the printing operation is maintained within a manifold 133 and is forced out under pressure through a series of orifices 132 (only one orifice 132 being illustrated in FIG. 9). This causes formation of a series of streams 127, which are caused to break up into manifold sized and regularly spaced drops under the stimulating action of a stimulation transducer (not illustrated). The break up of streams 127 into drops occurs at charging electrodes 130 which are a series of conductively coated notches along one edge of a charge plate 131. Charge plate 131 is constructed as taught in Culp U.S. Pat. No. 3,618,858.

As drops are formed by drop streams 127, they are selectively charged by charging voltages applied to charging electrodes 130. These charging voltages may have any of five different levels (one of which may be zero), so any drop in one of streams 127 may have any one of five different charging states.

After the drops are charged as above described, they pass through an electrostatic deflection field established between a pair of deflection electrodes 129 and 135. This causes the drops to be deflected in proportion to their charge level. Thus the drops may be caused to follow any one of five different trajectories 127a through 127e, as illustrated in FIG. 9. Those of the drops which are highly charged follow the most deflected trajectory 127e and are caught by a catcher 128. These are non-printing drops. All other drops deposit on copy sheet 102 at printing positions 139a through 139d.

It will be appreciated that the position of catcher 128 is a matter of convenience and that trajectory 127e could be a printing trajectory and trajectory 127a a catching trajectory. It will also be appreciated that the drops forming the streams 127 tend to interact with each other. Thus it may be desirable to place compensating voltages on charging electrodes 130 and to place non-printing guard drops between printing drops. Such generation of compensating voltages and the provision of guard drops is well known and need not be discussed here in further detail.

As mentioned above, the printing control information which is stored on disk 107 consists of black/white or print/no-print data. Print electronics 110 must convert such binary data into multi-level charge signals for generation of appropriate charging voltages. This is conveniently accomplished by generating a stairstep control waveform for each control channel and switching the waveform on or off in response to the black/white state of the data read-out from print buffer 109. Circuitry for generating such a stairstep waveform is well known and need not be further described. By way of example, such circuitry may function as generally described in Lewis et al U.S. Pat. No. 3,298,030.

Reference will now be made to FIG. 8 for an explanation of the relationship between the coordinate system of scanning array 103 and the coordinate system of print head 104. FIG. 8 illustrates only a portion of one of the printed bands 105. The figure illustrates a rectangular matrix with each cell representing a picture element or pel on either original document 101 or on copy sheet 102. The vertical columns and horizontal rows of the cells are given column numbers and row numbers which uniquely define the position of a cell on the original document and as scanned by scanning array 103. The figure also gives a series of additional designations for certain of the cells as they may be printed by drops from a series of three orifices indicated by the letters J, K and L.

The cell designations in FIG. 8 each consist of an identifying letter (referring to the orifice which prints that cell) and two subscripts. In each case the first subscript refers to an output line number count ($S_l$) and the second subscript refers to a drop count ($S_d$). The drop count, $S_d$, cycles from T-1 to 0 where T denotes the number of printing positions for each orifice. The output line count, $S_l$, increases progressively from 0 upward, with a new count being added for each the new cycle of $S_d$. As shown in FIG. 8, the first cell printed by orifice J is cell $J_{00}$, and this cell is printed simultaneously with the printing of cell $K_{00}$ by orifice K and cell $L_{00}$ by orifice L (assuming that drops of ink are to be deposited at all three cell locations). Thereafter, the three orifices simultaneously print cells $J_{01}$, $K_{01}$ and $L_{01}$, and so on until they print $J_{03}$, $K_{03}$ and $L_{03}$. At this time, the line count is incremented and the orifices begin printing $J_{10}$, $K_{10}$ and $l_{10}$.

It will be seen that cell $J_{00}$ can be designated alternatively as cell $R_{38}C_{25}$, where the first term denotes the row number of the scanned original document, while the second term denotes the corresponding column. The printing control electronics knows the identification of each orifice and also knows the line count and the drop count at all times. This means, in effect, that the printer knows the cell designation for each cell printed. In order to carry out the printing operation, the printer needs to know whether the scanner has generated a "0" or a "1" for that particular cell. The required information is determined by reading the stored contents for the memory row and column which correspond to the known cell identification. The determination of the correct row and column is performed by control unit 136.

The general equations for calculating the row and column numbers are:

$$R = S_1 - K_1 + S_d - (T+1)n$$

$$C = K_2 n + T + b$$

Where:
n = orifice number
b = print head number
$K_1$ = row number constant
$K_2$ = column number constant In the preferred embodiment, as herein described, there are four printing positions per orifice. For that case the above equations become:

$$R = S_d - K_1 + S_1 - 5n \quad \text{(Equation 1)}$$

$$C = K_2 n + T \quad \text{(Equation 2)}$$

Figure 10B:
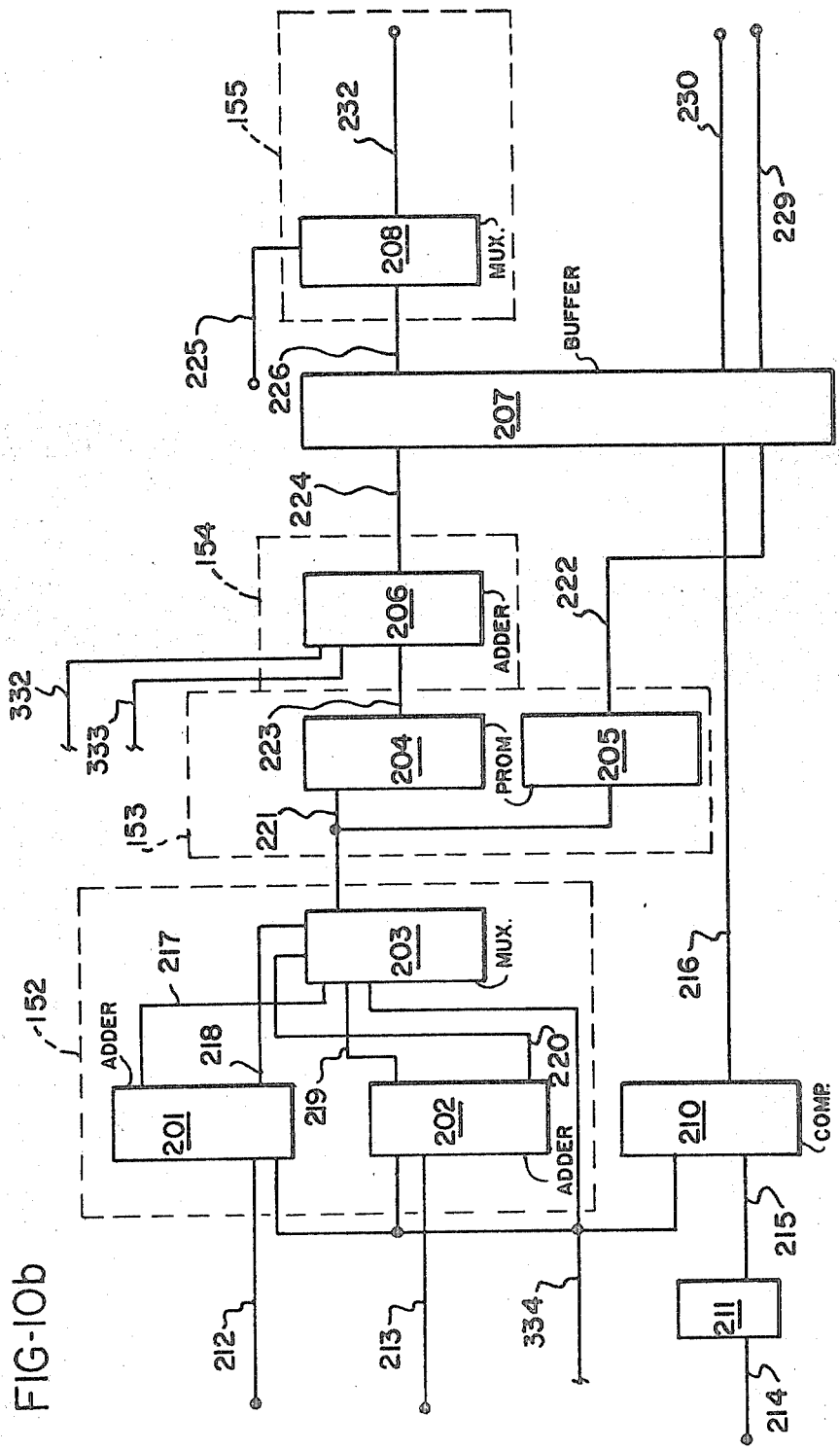

The solution of these equations is performed by circuitry as illustrated in block diagram form in FIGS. 10a and 10b. The system includes two identical circuits of the type shown in FIG. 10a and four of 10b. The circuits collectively generate row and column addresses for four groups of 54 orifices, which are all of the orifices in one print head. The memory within I/O RAM 108 is organized in such a manner that the addresses can be used in parallel for accessing data at four different memory locations. This provides printing control information for all four print heads.

Figure 11:
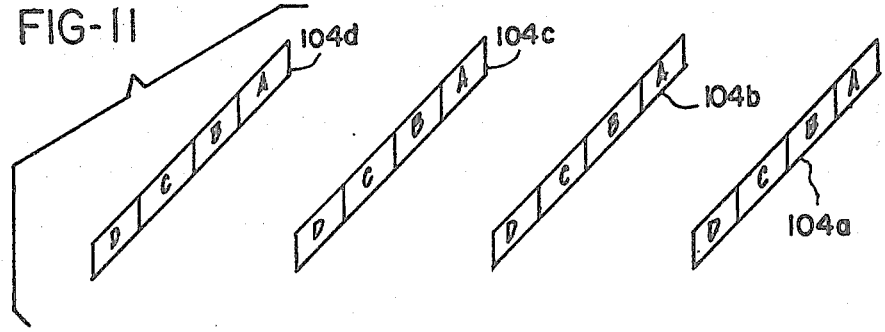
FIG. 11 illustrates an arrangement of printing head segments within a series of jet drop printing heads.

Print heads 104 are therefore organized as generally illustrated by heads 104a through 104d of FIG. 11. Thus each head may be viewed as comprising four head segments A through D. Each such head segment includes orifices and printing control electronics for 54 different jets. Each jet in turn prints within four columns of FIG. 8, so that each head segment carries out the printing for a group of 216 adjacent columns representing one of the printing bands 105 of FIG. 7. Collectively, the four printing heads with the sixteen head segments print 3,456 columns across the width of copy sheet 102. Scanning array 103 therefore scans image information at 3,456 scanning positions across original document 101. The column coverage for the sixteen head segment is set forth in Table I below:

TABLE I

| Head | Segment | First Column | Last Column |
|------|---------|--------------|-------------|
| 104a | A | 0 | 215 |
| 104a | B | 216 | 431 |
| 104a | C | 432 | 647 |
| 104a | D | 648 | 863 |
| 104b | A | 864 | 1079 |
| 104b | B | 1080 | 1295 |
| 104b | C | 1296 | 1511 |
| 104b | D | 1512 | 1727 |
| 104c | A | 1728 | 1943 |
| 104c | B | 1944 | 2159 |
| 104c | C | 2160 | 2375 |
| 104c | D | 2376 | 2591 |
| 104d | A | 2592 | 2807 |
| 104d | B | 2808 | 3023 |
| 104d | C | 3024 | 3239 |
| 104d | D | 3240 | 3455 |

Figure 12:
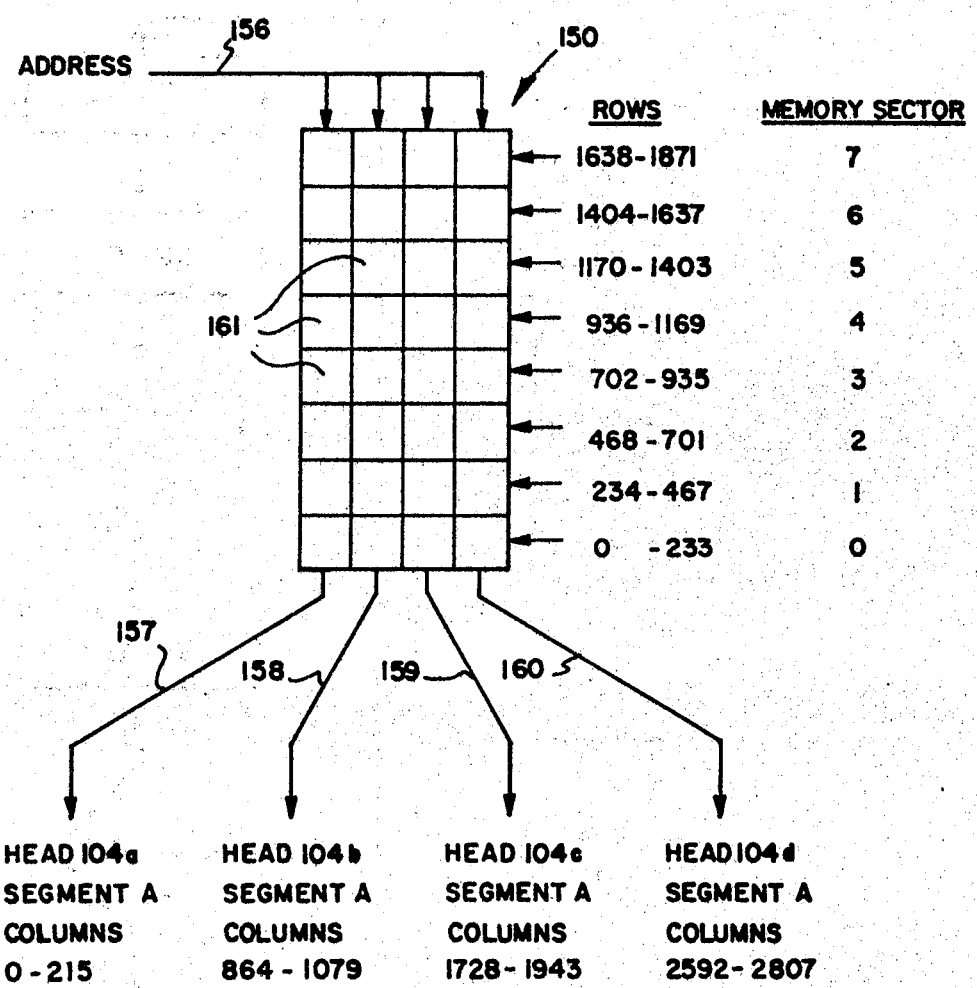
FIG. 12 is a schematic diagram of a memory segment for an Input/Output RAM.

In order to produce printing control data, I/O RAM 108 is organized into four memory segments 150, one of which is schematically illustrated in FIG. 12. Each memory segment 150 produces printing control information for one print head segment from each of print heads 104a through 104d. Thus memory segment 150 of FIG. 12 may produce printing control information for all four head segments A and stores image information for four groups of columns within eight memory sectors 0-7. In such a case the memory segment controls the printing of columns 0-215, 864-1079, 1728-1943 and 2592-2807. The actual printing of these columns is handled by the first 54 jets in each print head, all operating in synchronism and the memory organization simplifies addressing for printing control, as hereinafter described with reference to FIGS. 10a and 10b.

Each memory segment 150 comprises 32 RAM chips 161. Each such chip is a 64K storage device having 65,536 storage locations. However, not all storage locations are used. At any one time a given chip stores image information for an image area comprising 216 columns and 234 rows or 50,544 bits. Collectively, the chips comprising a memory segment 150 store image information for 1,872 rows at any one time. It will be recalled that for the embodiment herein described, each print head 4 has 216 orifices arranged at a center-to-center spacing of five scan lines in the printing direction. Thus, the print heads simultaneously print within printing cells having a maximum spacing of 1080 printing rows. This spacing is easily handled by the 1,872 scan lines of data stored in the four memory segments 150 comprising I O RAM 108.

As printing proceeds, control unit 136 generates addresses for output reading of information stored in each of memory segments 50. This requires simultaneous generation of four addresses, one for each memory segment. Each such address is applied to the appropriate memory segment by a group of address lines, as indicated in FIG. 12 by the reference numeral 156. Each address is applied in parallel to four groups of RAM chips 161 for simultaneous output reading of data bits on four output lines 157-160.

The above mentioned addresses are generated by the circuitry of FIGS. 10a and 10b (together with non-illustrated companion circuitry) in accordance with equations 1 and 2 above. However, due to the organization of the memory and the addressing thereof, it is not necessary to include the term "b" in the calculation of column addresses. Thus for example, a row-column address $R_{469}$, $C_{101}$ automatically is treated as $R_{469}$, $C_{101}$ for head 104a; $R_{469}$ $C_{965}$ for head 104b; $R_{469}$, $C_{1829}$ for head 104c; and $R_{469}$, $C_{2693}$ for head 104d.

During printing, control I/O RAM 108 is loaded with 1,872 scan lines of image information and thereafter is reloaded once or twice depending upon the length of the page being printed. The dynamic memory is sufficiently oversized to permit such reloading while continuously providing printing control information for the above mentioned 1080 printing rows. After a page has been printed, I/O RAM is loaded with image information for the next page.

Figure 13:
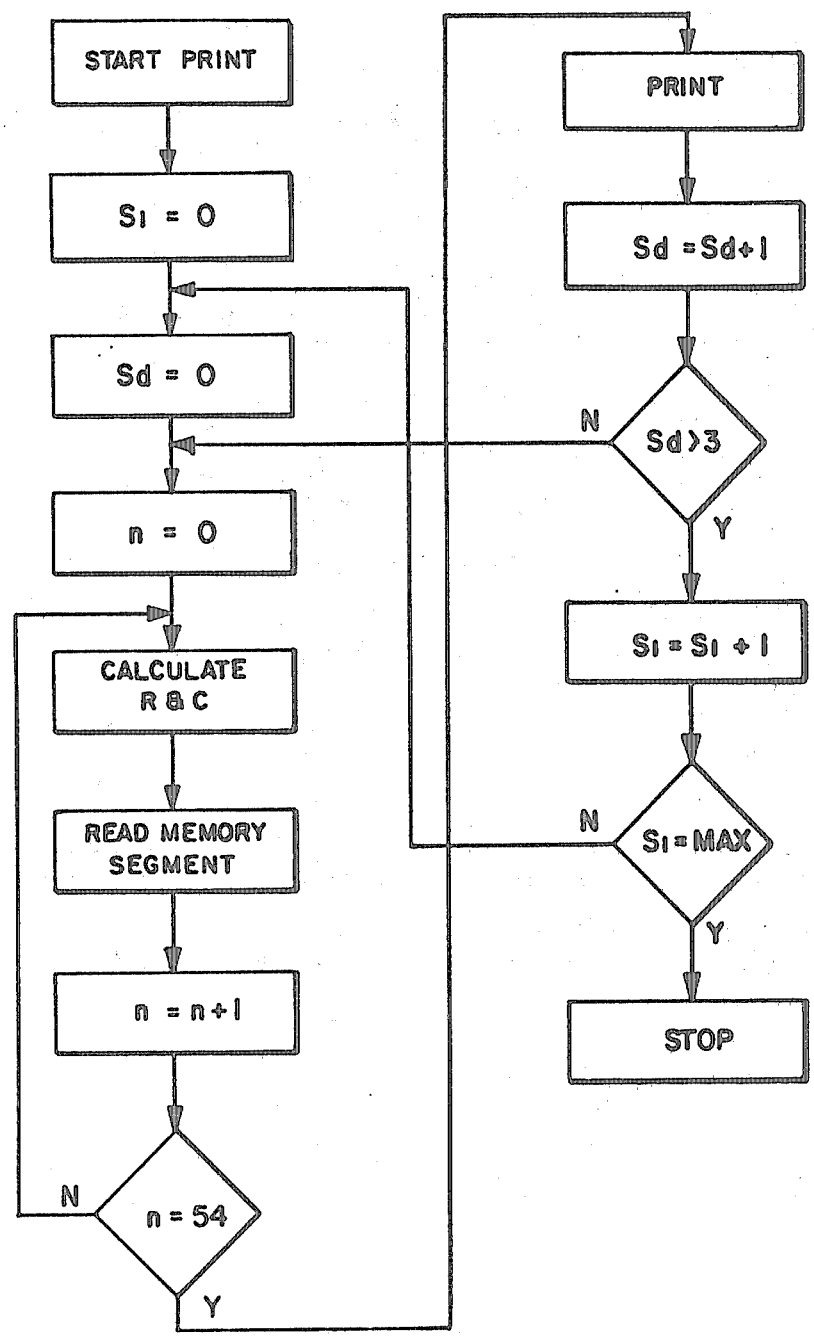
FIG. 13 is a data processing flow chart.

The flow chart of FIG. 13 illustrates the process by which the addresses applied to one of memory segments 150 are calculated. The calculation commences by setting the line number count, the drop count and the orifice count equal to 0. The system then calculates a row number and a column number for memory segment addressing. After the address has been generated, the memory segment is accessed to read out four bits of image data to be loaded into print buffer 109. Thereafter, the orifice count is incremented and a new address is calculated. Incrementing of the orifice continues until 54 addresses have been generated.

After 54 addresses have been generated, print buffer 109 contains enough data for generation of a print command for all of the jets in each of print heads 104. Accordingly, print buffer 109 transfers the accumulated image information to print electronics 110, which generate 864 printing commands (216 for each of print heads 104). At this time, all jets are in readiness for a charging control signal which will result in printing or non-printing at printing position 139a of FIG. 9.

After the first set of printing commands have been generated, the drop count ($S_d$) is incremented, and a new set of printing commands is generated. The process continues and new sets of printing commands are generated until printing control commands have been generated for printing at each of drop positions 139a through 139d. Thereafter, the line number count ($S_1$) is incremented and the logic looping continues. After the line number count reaches some maximum number indicating that the printing of information contained within the memory segment has been completed, then printing temporarily terminates, and I/O RAM 108 is loaded with new data from disk 107.

Reference will now be made to FIGS. 10a and 10b for a description of the circuitry which performs the process outlined in the flow chart of FIG. 13. FIG. 10a presents a block diagram of a row number calculation circuit 151, which produces row addresses at output lines 334 and 335 for two of memory segments 150. Accordingly, there are two such row number calculation circuits 151 for servicing the entire set of four memory segments 50.

The row number address on line 334 is applied to circuitry illustrated in FIG. 10b which calculates a column address and produces a combined address at output line 232. The row address at line 335 is applied to other circuitry similar to the circuitry illustrated in FIG. 10b. There are a total of four circuits of the type illustrated in FIG. 10b which cooperate with the illustrated row number calculation circuit 151 and its non-illustrated companion circuit.

Circuit 151 includes a 14-bit line number counter 300, a two-bit drop counter 301 and a six-bit orifice counter 302. Output counts from these three counters are applied to exclusive OR gates 303a through 303c, along with a signal on line 314 indicating whether a front side copy or a rear side copy is to be printed. As previously described, printing on the second sides of the sheets must progress, with respect to the printed image, in the opposite direction from that in which the printed image was printed on the first sides of the sheets, if the top portions of the images on both sides of each sheet are to be positioned adjacent the same sheet edge. That is, if front side printing progresses from the top of the sheet downwardly, then rear side printing must progress from the bottom of the sheet upwardly. This requires the generation of row number addresses which are inverted from those utilized for front side printing. Exclusive OR gates 303a through 303c perform ones complement operations on the counts passing therethrough in order to achieve the required inversions. Further column addresses are inverted within each print head segment. The print control data has previously been supplied to the I/O RAM 108 with the data segments in inverted order. For example, data which would normally be stored in the area of RAM 108 reserved for segment A of print head 104a during front side printing is switched with the data which would normally be stored in the area of RAM 108 reserved for segment D of print head 104d. Inversion of the data for each of the individual segments by selection of the proper column number addresses completes the column inversion process. The row count ($S_1$) from exclusive OR gate 303a is applied via line 319 to an adder 304, where it is added to a fixed number generated by PROM 309. PROM 309 is connected to receive the rear side control signal generated on line 314 and responds by generating an appropriate row count correction number for application to adder 304.

The orifice count from exclusive OR gate 303c is similarly applied via line 321 to adder 306, which also receives an input directly from line 314. Adder 306 adjusts the orifice count as required for rear side printing.

The adjusted orifice count from adder 306 is applied via line 330 to a buffer 308 and also to another adder 307. Adder 307 effectively multiplies the orifice count by a number equal to the number of rows between orifices (in this case five). Inverter 323 inverts the output from adder 307 and applies it to adder 305, where it is added to the output from adder 304 appearing on line 331. Adder 305 then produces an output on line 326 which is equal to the quantity $S_1$.

The output from adder 305 is applied to adders 312 and 313 where it is added to numbers which are read out from PROMS 310 and 311 on lines 325 and 327, respectively. The numbers on lines 325 and 327 correspond to the term $K_1$ of Equation 1 above. The summations which are produced by adders 312 and 313 appear at output lines 329 and 328, respectively. These suammations each correspond to the quantity $S_1 - K_1$. The quantities on lines 329 and 328 differ only in the value of $K_1$, as generated by PROMS 310 and 311. In a typical case where the illustrated circuit 151 generates row addresses for bar segments A and B, the numbers generated by PROMS 310 and 311 are 0 and minus 270, respectively. The corresponding PROMS in the non-illustrated circuit 151 generate $K_1$ values of minus 540 and minus 810, respectively.

The quantities appearing on lines 328 and 329 are applied to buffer 308, where they are added to the drop count appearing on line 320. Buffer 308 then produces an adjusted orifice count n on line 332, and adjusted drop count $S_d$ at line 333 and two row number calculations at lines 334 and 335. The values appearing on lines 334 and 335 are solutions for Equation 1.

The circuitry appearing in FIG. 10b includes a normalizing circuit 152, a "base and where" circuit 153, a modifying circuit 154, and an addressing circuit 155. Normalizing circuit 152 normalizes the row number calculation to produce a number within the range of the eight memory sectors mentioned above. Referring again to FIG. 12, it will be seen that the eight memory sectors encompass a total of 1,872 rows. Thus a binary signal equal to the number −1,872 is applied to line 212 and supplied to adder 201 along with the signal generated by column addressing circuit 151 on line 334. Adder 201 has two outputs on line 217 and line 218 which are R−1872 (in binary form).

Circuit 152 includes another adder 202 which is connected to receive a binary number equivalent to the number −3,744 on line 213, as well as the row number count on line 334. Adder 202 has two outputs on line 219 and line 220 which are R−3744 (in binary form).

The output signals from adders 201 and 202 are applied to multiplexer 203, which generates a normalized row number which is less than the number 1,872. The output from multiplexer 203 appears on line 221 and is equal to the number appearing on line 234, or that number reduced by either 1,872 or 3,744 as appropriate to maintain the row number count below its maximum limit.

The normalized row number on line 221 is applied to PROM 204 and PROM 205. PROM 204 translates the row number to a base memory address number and applies the translated number on line 223 to adder 206. Adder 206 also receives an orifice count on line 332 and a drop count on line 333. Adder 206 carries out the addition of Equation 2 above to compute a column number. The column number then is combined with the address received on line 223 to produce a 16-bit memory address on line 224. This address is applied to buffer 207. Buffer 207 also receives a memory sector number on line 222 from PROM 205 and a print interruption command on line 216 from comparator 210. Comparator 210 compares the row number count on line 334 with a maximum count received on line 215 from PROM 211. If the count on line 334 exceeds the count on line 215, then the system determines that the length of copy sheet 102 has been exceeded and that printing must be halted, for that particular R and n.

Buffer 207 generates a memory sector address on line 229, a print interruption command on line 230 and a 16-bit memory address on line 226. The memory address on line 226 is applied to multiplexer 208 along with a signal on line 225 which is the dynamic RAM memory address switch. Multiplexer 208 generates two eight-bit memory address for addressing one of the four memory segments 150. These two addresses are the row and column addresses for the dynamic RAMS. In conjunction with the memory address on line 232, a memory sector address is generated on line 229. The memory sector address designates in which memory sector of FIG. 14 the required data is located. This data is generated by PROM 205 from data on line 221.

Figure 15:
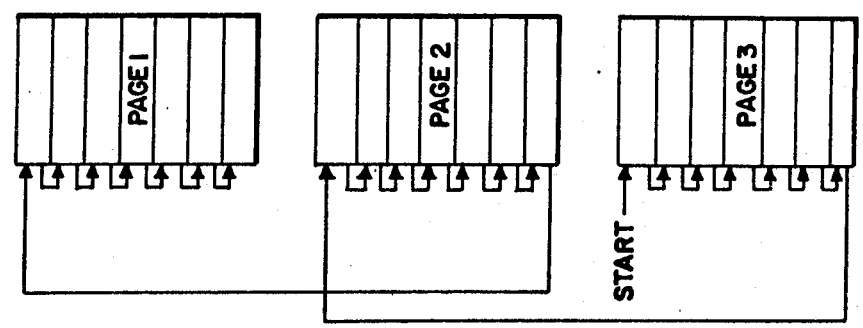
FIG. 15 illustrates the printing sequence for a plurality of copy sheets which are printed on a single side only.
Figure 14:
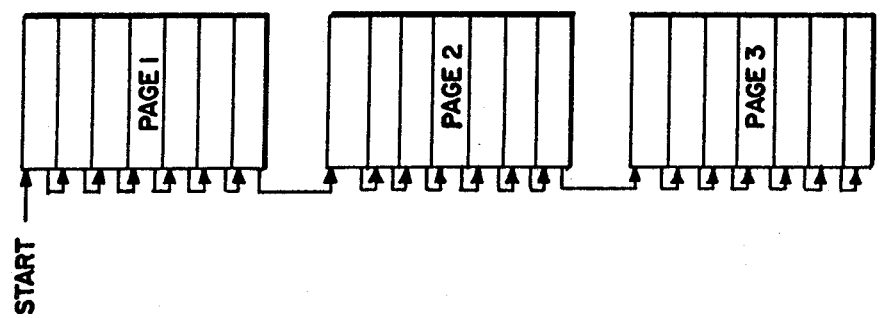
FIG. 14 illustrates the scanning pattern for a plurality of original documents.

FIG. 14 illustrates the scanning sequence for a plurality of original documents. As illustrated in FIG. 14, three original documents may be scanned in sequence from top to bottom and the information so scanned is loaded into memory. When the system makes a copy of such a document on the front sides only of three copy sheets, then printing commences at the top of page 3, as illustrated in FIG. 15. Printing progresses along page 3 from top to bottom and then along page 2 from top to bottom. Lastly, page 1 is printed from top to bottom.

Figure 16:
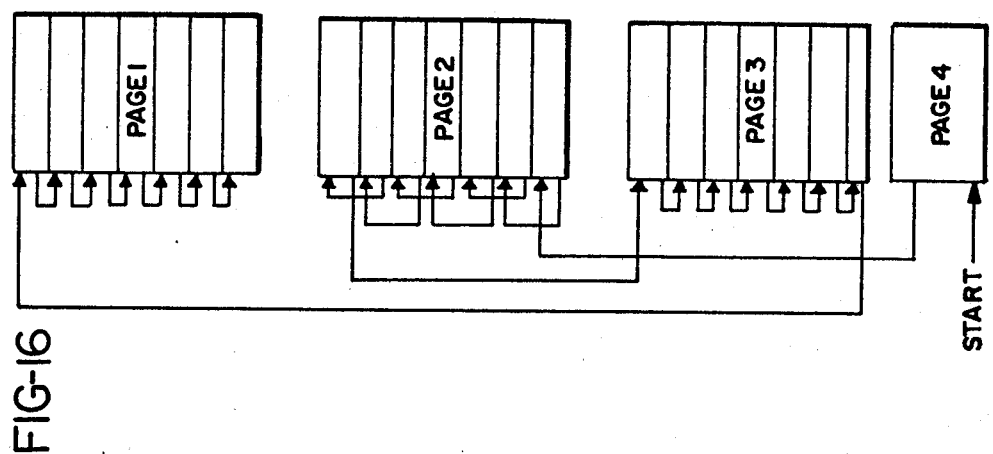
FIG. 16 illustrates the printing sequence for a plurality of copy sheets which are printed on both sides.

For duplex printing of a document which may comprise four pages, printing proceeds as illustrated in FIG. 16. Thus, page 4 is printed from bottom to top, followed by bottom to top printing of page 2. Thereafter, pages 3 and 1 are printed in sequence from top to bottom on the opposite sides of the sheets. A programmed microprocessor may be used for controlling the printing sequence as well as the document handling and other operations related thereto. Preferably, the system uses a multiprocessor including a programmed system controller and separately programmed area controllers. A number of suitable microprocessing systems are commercially available for such purposes.

A number of alternative embodiments of the present invention will be readily apparent. For example, control unit 136 could address I/O RAM 108 prior to input to disk unit 107, so that scanning data from scan buffer 106 would be stored by disk unit 107 in a transformed format. In such an embodiment the data read out from disk unit 107 could be supplied directly to print buffer 109.

While the method herein described, and the form of apparatus for carrying this method into effect, constitute preferred embodiments of the invention, it is to be understood that the invention is not limited to this precise method and form of apparatus, and that changes may be made in either without departing from the scope of the invention.

What is claimed is:

1. In a printing system of the type in which print control information is stored in a memory, said print control information defining a plurality of document images which are to be duplex printed on a plurality of copy sheets, and in which a copy sheet path extends past a sheet supply, a print station, an inverter station, and to an output, the method of printing comprising the steps of:

sequentially supplying a plurality of copy sheets from said sheet supply to said sheet path, sequentially transporting said sheets along said sheet path past said print station for printing selected ones of said document images on the first sides of said sheets, sequentially retrieving said print control information from said memory in a first order to control printing on said first sides of said sheets, sequentially printing selected ones of said document images on the first sides of said sheets, sequentially inverting each of said sheets which is to be duplex printed and transporting each inverted sheet immediately back toward said print station, sequentially retrieving said print control information from said memory in a second order to control printing on said second sides of said sheets in an orientation which is different with respect to said print station than the orientation in which said first sides of said sheets are printed, sequentially printing selected ones of said document images on the second sides of said inverted sheets to produce duplex printed sheets, and transporting said duplex printed sheets to said output.

2. The method of claim 1 in which said step of sequentially printing selected ones of said document images on the second sides of said inverted sheets includes the step of printing images on the second sides of said inverted sheets in an orientation which is inverted with respect to the orientation in which document images are printed on the first sides of said sheets.

3. The method of claim 3 in which the document images on said first and second sides of each of said duplex printed sheets have their top portions adjacent the same sheet edges of said sheets.

4. The method of printing of claim 1, further comprising the step of:

periodically sequentially supplying an additional plurality of copy sheets from said sheet supply to said sheet path for printing on the first sides thereof after printing on the second sides of at least some of the previously supplied plurality of copy sheets.

5. The method of claim 4 in which said step of periodically sequentially supplying an additional plurality of copy sheets from said sheet supply to said sheet path includes the step of supplying said additional plurality of copy sheets to said sheet path such that said additional plurality of copy sheets follow the previously supplied plurality of copy sheets in said sheet path.

6. The method of claim 5 in which the second sides of said previously supplied plurality of copy sheets are printed prior to printing the first sides of said additional plurality of copy sheets.

7. A printing system for duplex printing a plurality of document images on a plurality of copy sheets, comprising:

memory means for storing print control information defining a plurality of document images, means for retrieving said print control information from said memory means in a first order for printing on said first sides of said sheets, and for retrieving said print control information from said memory means in a second order for printing on said second sides of said sheets, printer means for selectively printing said document images on copy sheets transported past a print station, copy sheet transport means for transporting copy sheets past said print station, said copy sheet transport means defining a closed sheet path of sufficient length that a plurality of copy sheets may be transported by said transport means along said path simultaneously, copy sheet supply means for supplying sheets to said copy sheet transport means, copy sheet inverter means for receiving copy sheets sequentially from said copy sheet transport means and immediately returning said sheets to said copy sheet transport means in an inverted orientation, output means for receiving sheets from said copy sheet transport means after printing thereon, and control means for selectively directing copy sheets in said sheet path to said output means or to said inverter means subsequent to printing, whereby a plurality of sheets transported by said transport means past said printer are printed on a first side, inverted, and subsequently printed on a second side prior to being directed to said output means.

8. The printing system of claim 7 in which said control means comprises means for controlling operation of said copy sheet supply means such that printed copy sheets directed to said output means are replaced in said sheet path by copy sheets from said copy sheet supply means, whereby a predetermined number of sheets are maintained in said closed sheet path.

9. The printing system of claim 7 in which said copy sheet inverter means includes means for returning each inverted copy sheet to said copy sheet transport means prior to inversion of the next copy sheet received by said copy sheet inverter means.

* * * * *